US012167108B1

(12) United States Patent
Dubey et al.

(10) Patent No.: US 12,167,108 B1
(45) Date of Patent: Dec. 10, 2024

(54) ON DEMAND VIDEO CONTENT SUMMARIZATION

(71) Applicant: Amazon Technologies, Inc., Seattle, WA (US)

(72) Inventors: Deep Dubey, Bellevue, WA (US);
Sushanta Das, Kirkland, WA (US);
Kenneth Benoit, Ravensdale, WA (US);
Anup Gandotra, Shoreline, WA (US);
Adam Fluckey, Shoreline, WA (US);
Nikhil Kajale, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 16/258,368

(22) Filed: Jan. 25, 2019

(51) Int. Cl.
*H04N 21/6587* (2011.01)
*G06V 20/40* (2022.01)
*H04N 21/442* (2011.01)
*H04N 21/8549* (2011.01)

(52) U.S. Cl.
CPC ......... *H04N 21/8549* (2013.01); *G06V 20/40* (2022.01); *H04N 21/44204* (2013.01); *H04N 21/6587* (2013.01)

(58) Field of Classification Search
CPC ........... H04N 21/8549; H04N 21/6587; H04N 21/44204; G06K 9/00711
USPC ...................................................... 386/241
See application file for complete search history.

(56) References Cited

U.S. PATENT DOCUMENTS

| | | | | |
|---|---|---|---|---|
| 9,094,738 | B2* | 7/2015 | Kishore | H04N 21/23439 |
| 10,083,360 | B1* | 9/2018 | Woolley | G08B 13/19602 |
| 2007/0067724 | A1* | 3/2007 | Takahashi | G11B 27/031 |
| | | | | 715/723 |
| 2007/0245242 | A1* | 10/2007 | Yagnik | G06K 9/00711 |
| | | | | 715/721 |
| 2008/0152300 | A1* | 6/2008 | Knee | G11B 27/005 |
| | | | | 386/250 |
| 2009/0142033 | A1* | 6/2009 | Schmouker | H04N 5/76 |
| | | | | 386/235 |
| 2012/0284094 | A1* | 11/2012 | de Leon | G06F 16/739 |
| | | | | 705/14.4 |
| 2015/0193061 | A1* | 7/2015 | Stekkelpak | G06F 3/048 |
| | | | | 715/716 |
| 2015/0235672 | A1* | 8/2015 | Cudak | H04N 21/8153 |
| | | | | 386/241 |
| 2015/0338917 | A1* | 11/2015 | Steiner | H04L 9/3231 |
| | | | | 345/156 |

(Continued)

*Primary Examiner* — Helen Shibru
(74) *Attorney, Agent, or Firm* — Eversheds Sutherland (US) LLP

(57) ABSTRACT

Systems, methods, and computer-readable media are disclosed for systems and methods for on demand video recap generation. Example methods may include determining a first request to resume playback of video content, wherein the first request is associated with a user account, determining, using historical consumption data associated with the user account, a portion of the video content that has been consumed, where the portion of the video content comprises a first video segment and a second video segment, determining that a first video segment ranking of the first video segment satisfies an importance threshold, generating a video recap of the portion of the video content, wherein the video recap comprises the first video segment, and causing presentation of the video recap.

13 Claims, 7 Drawing Sheets

(56) References Cited

U.S. PATENT DOCUMENTS

| | | | |
|---|---|---|---|
| 2016/0133297 A1* | 5/2016 | Thornton | H04N 7/18 386/230 |
| 2016/0149956 A1* | 5/2016 | Birnbaum | H04L 63/101 726/1 |
| 2017/0280208 A1* | 9/2017 | Mishra | H04N 21/8549 |
| 2018/0192149 A1* | 7/2018 | Anguiano | G06T 1/0007 |

* cited by examiner

ON DEMAND VIDEO CONTENT SUMMARIZATION

BACKGROUND

Certain digital content, such as movies, television shows, and other video content may be available via streaming. For example, users may stream movies, television series, and so forth using streaming devices, such as smartphones, televisions, etc. However, users may not consume video content in its entirety in a single sitting. For example, a user may watch part of a movie or part of a show series and then resume watching at a later time, such as a day or more later. The user may not remember or may wish to refresh their memory of events that occurred during the portion of the video content that they previously consumed. Accordingly, on demand video content summarization may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
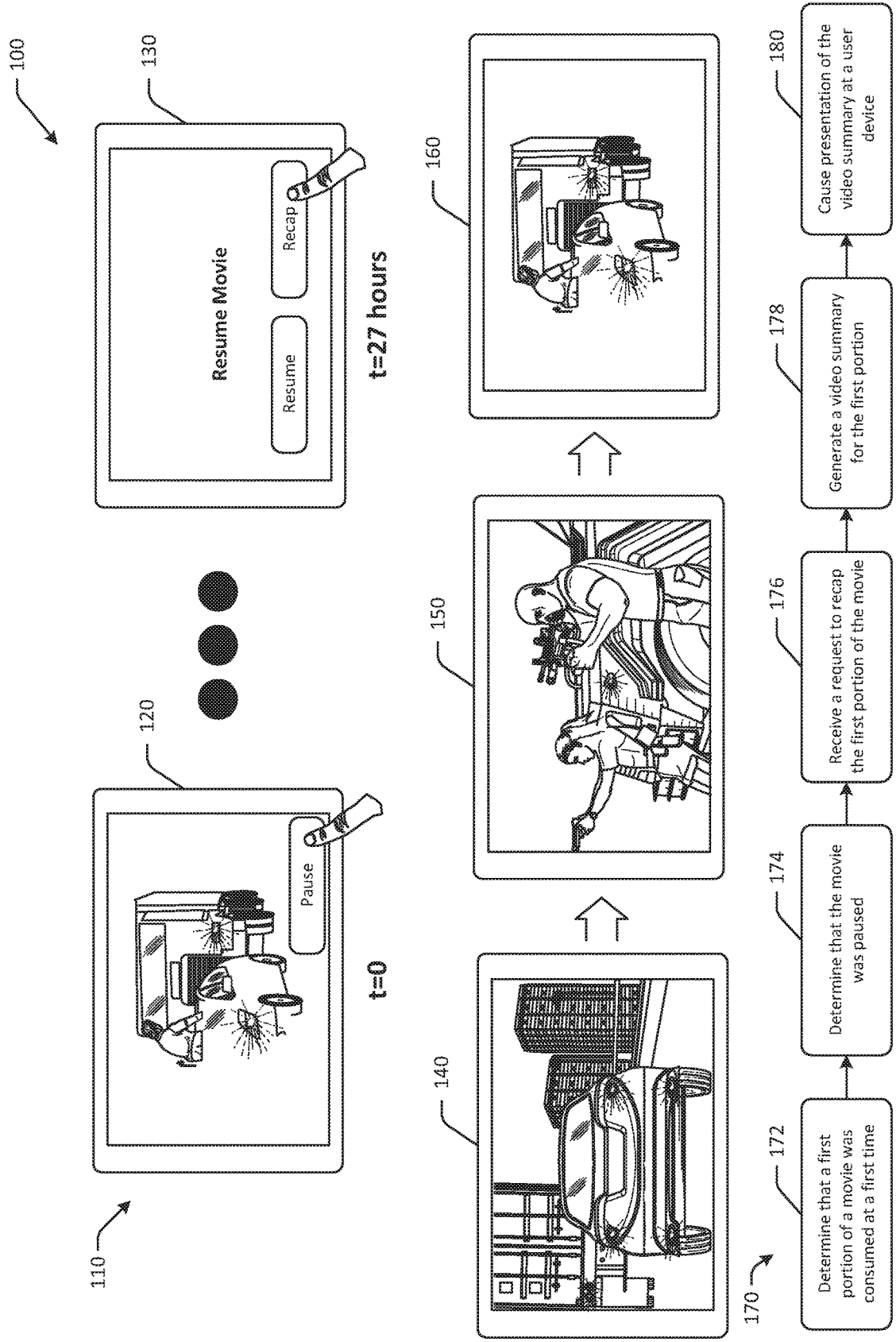
FIG. 1 is a schematic illustration of an example use case for on demand video recap generation and presentation in accordance with one or more example embodiments of the disclosure.

Digital content may include video content, such as movies, television shows, streaming shows (e.g., made for Amazon Prime, Netflix, etc.), and other video content. Users may consume such video content using content streaming devices, such as smartphones, televisions, streaming devices coupled to televisions, and other devices. Some video content, such as a season premiere of an existing television show, or a movie sequel, may include a recap of events that occurred during previous episodes or movies. For example, at the beginning of the episode or movie, a brief recap of events may be presented in the form of clips or segments of the previous movie(s) or episode(s). The recaps may serve to refresh the user's memory and/or to provide context for upcoming events in the current episode or movie. The recaps may be manually generated and/or may only be presented at the beginning of the episode or movie. However, in some instances, users may consume part of a movie or episode, and may then take a break and return later to resume consumption. For example, the user may watch part of a movie at night and then return to finish the movie the next night or several days later. The user may desire to view a recap of events that occurred in the movie during the previous content consumption session. Likewise, a user may consume a few episodes of a series and then return days later to continue consuming another episode in the series, but may desire to view a recap of the events that occurred during the already consumed episode(s). Such recaps may not be readily available, as mid-movie recaps may not be generated by a content creator and/or associated with the movie, and/or mid-season or mid-episode recaps may not be generated by a content creator and/or associated with the series. In addition, users may desire to consume recaps of consumed video content at times other than during the beginning of content, such as other than at the beginning of a movie or episode.

Embodiments of the disclosure include systems and methods to automatically generate video content summaries, or video recaps, of a consumed portion of video content at any point. For example, certain embodiments may automatically generate video content summaries on demand at any point during presentation of video content. For example, during presentation of a movie, a user may pause and request an on demand recap of events that occurred during a consumed portion of the movie or other video content, such as an episode. In another example, during presentation of an episode in a series of video content (e.g., at the beginning of the episode or at any point during the episode, etc.), a user may request an on demand recap of events that have previously occurred in one or more preceding episodes that have been consumed.

On demand video summaries may be generated based at least in part on an importance of scenes that have occurred in consumed portions of content. For example, some embodiments may separate video content into discrete video segments using one or more video processing algorithms, text processing algorithms, and/or audio processing algorithms to identify and/or determine scenes that have taken place in consumed portions of the content. The identified segments may be analyzed to determine the most important scenes that have been consumed. In some instances, consumed portions of the content may not necessarily have been viewed by a user. Rather, a user may fast forward to a certain point in content without consuming any of the content, or select a starting point in the middle of the content, and a recap may be determined for the portion of the content that the user bypassed or skipped.

Importance may be determined based at least in part on events that occur during the scenes. Importance may be represented using one or more scores generated for scenes, such as importance scores. Scenes may be ranked using respective scores. Importance scores may be generated based at least in part on activities or events that occur in a video segment, objects that appear in the video segment, dialog, sound effects, music, and/or other audio features during the segment, and/or other factors.

The scores may be used to select video segments and/or portions of segments for inclusion in a recap or video content summary. For example, a content summary may include segments or portions of segments stitched together in a continuous video to form a summary, such as a recap of previously consumed content. The content summary may be formatted into a video file, for example, and sent to or otherwise made available for retrieval by a user device. The video file may be presented to a user for consumption. Recaps may span content consumed during a previous content consumption session, or during multiple previous content consumptions. For example, the video recap may cover only content consumed during an immediately prior content consumption session (e.g., the last time a user watched the video content, etc.) in some embodiments, while in other embodiments, the video recap may cover content consumed during multiple prior content consumption sessions (e.g., the entire consumed portion of a movie or other video content regardless of how many sessions the user consumed the movie in, etc.).

In some embodiments, a length of a content summary may be dynamically determined. For example, a length of a content summary may be determined based at least in part on an amount or length of the consumed portion of the video content. In another example, a length of the content summary may be determined based at least in part on an elapsed time since a previous content consumption session for the video content. For example, the longer it has been since the user last watched the video content, the longer the video summary may be. Summary length may be determined by a number of video segments or portions that are included in the content summary.

To generate the recap or content summary, in one example, the segments of the content to be included in the recap may be extracted from a content file associated with the content, and may include one or more of audio content, text content, and/or video content. The extracted content may be joined or otherwise combined into a single continuous video and may be stored, in one example, in a suitable video file format. In some embodiments, theme music or other music associated with the content or in a music library may be used as background music for the content summary and may be included in the video file. The video file may be streamed to a user device or otherwise provided for consumption by the user.

This disclosure relates to, among other things, devices, systems, methods, computer-readable media, techniques, and methodologies for on demand video recap generation and presentation. Certain embodiments may automatically generate content summaries for digital content, such as video content (e.g., movies, television programs, streaming content, etc.), based at least in part on one or more consumed portions of the video content. Certain embodiments generate content summaries using, for example, analysis of audio, video, and text (e.g., closed captioning, synopses, metadata, etc.) components of digital content, such as a movie, video, or other digital content. Certain embodiments determine aspects of content summaries, such as length and/or scene selection, using machine learning and other methodologies. In some instances, machine learning (e.g., deep neural networks, long short term memory units and/or recurrent neural networks, etc.) may be used to identify various elements of content that may increase a rate of conversion for users that consume a content summary.

Referring to FIG. 1, an example use case 100 for on demand video recap generation is depicted in accordance with one or more example embodiments of the disclosure. For example, a user may be consuming video content, such as a movie at a first instance 110. The first instance 110 may be a first point in time, as annotated in FIG. 1 with "t=0." A first user interface 120 may be presented at a user device at which the user is consuming the video content. The first user interface 120 may include an option to pause playback of the video content. The user may select the pause option. Playback of the video content may therefore be paused. For example, the user may have been watching a movie at nighttime and may desire to go to sleep. In another example, the user may have been watching the movie on a plane, and may have to pause playback to prepare for landing. The video content may be paused and a point in the movie at which the content is paused may be stored. For example, if the user consumed 43 minutes of the movie, the end time of 43:00 of the content may be determined and stored locally and/or at a remote server. Accordingly, the user may have consumed the first 43 minutes (e.g., from 0:00 to 43:00 of the content, etc.) of the movie during the content consumption session. In some embodiments, the first 43 minutes of the movie may have been consumed over more than one content consumption session.

At a later point in time, as denoted in FIG. 1 by "t=27 hours," such as later the next day, or 27 hours after completing the previous content consumption session, the user may return to continue watching the video content, or to resume playback. Accordingly, at a second user interface 130, an option to resume playback of the video content may be presented. An option to present a recap of the video content may also be presented. The recap option may initiate presentation of a recap or video summary of the consumed portion of the video content, such as a recap of the first 43 minutes of the content. The user may select the recap option at the second user interface 130. The user device may send a request for a recap to one or more remote servers. The recap option may be presented any time a user watches a portion of video content and returns, or may be presented after a certain length of time has passed since a user has consumed the particular video content.

One or more remote servers may determine the request for the recap. Based at least in part on a user account identifier (e.g., the account information of the first user or the user that is currently logged in or activated, etc.), a device identifier, and/or metadata, the one or more remote servers may determine the video content for which a recap is requested. The remote server may determine an amount of the video content that has been consumed in connection with the user account. The remote server may generate a video summary for the consumed of the video content.

To generate content summaries of consumed content, an example process flow 170 is presented and may be performed, for example, by one or more summary generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At a first block 172, the remote server may determine that a first portion of a movie was consumed at a first time. For example, the remote server may determine that the user consumed the first 43 minutes of the movie during the content consumption session. To initiate consumption of the movie, a user may request streaming of the movie. The remote server may determine a first request from the user device to stream the movie. The remote server may determine a user account associated with the first request, and may determine historical content consumption data associated with the user account. The historical content consumption data may be indicative of movies or other content that have been consumed in association with the user account. The remote server may use the historical consumption data to determine whether the user has previously consumed a portion of the content. For example, the remote server may determine that the movie is not present in the historical content consumption data, which may therefore indicate that the user has not consumed a portion of the content. The remote server may therefore cause presentation of the movie from the beginning. When the user pauses playback of the content, such as at the first instance 110, the historical content consumption data may be updated to indicate that the user consumed a portion of the content, along with additional data such as a date and/or time at which the content was consumed, a length of content consumed, and/or other data.

At a second block 174, the remote server may determine that the movie was paused. For example, at the first user interface 120, the user may pause the movie. The remote server may receive an indication that the movie was paused. The remote server may determine an end time of the movie at which the movie was paused (e.g., the end time may be 43:00 in the example of FIG. 1, etc.).

At a third block 176, the remote server may receive a request to recap the first portion of the movie at a second time. For example, at the second user interface 130, the user may select the recap option 27 hours after the movie was paused. The remote server may receive a corresponding request to recap the consumed portion, or the first portion, of the movie. The remote server may therefore determine that a video summary is to be presented, where the video summary provides a recap of a consumed portion of the movie.

At a fourth block 178, the remote server may generate a video summary for the first portion. For example, the remote server may determine the video content for which a content summary is desired using a video content identifier or other identifier. The remote server may determine an end time of the consumed portion of the movie. The end time may be 43:00 in the example of FIG. 1. The remote server may determine a set of video segments that have occurred in the movie from a starting time of the movie, such as the beginning of the movie (e.g., 0:00) to the end time of the consumed portion. The set of video segments may include scenes, events, plot elements, and/or other segments of the video content. The set of video segments may be determined using one or more of video processing, audio processing, and/or text processing of files associated with the video content. The remote server may determine ranking values for respective segments. The ranking values may be importance rankings and may be indicative of an importance of the respective segments to the overall video content. The rankings may be determined, for example, based at least in part on actions that take place during the segment (e.g., as determined by frame image analysis, dialog analysis, sound effect analysis, etc.), characters that appear during the segment, and/or other factors. The remote server may determine a subset of highest ranked video segments of the set of video segments. The subset may include the top ranked video segments. The number of top ranked or highest ranked segments that are included in the subset may be determined based at least in part on the length of the first portion (e.g., the more the user has consumed of the video content, the greater the number of segments may be, etc.), an elapsed length of time since the user consumed the content (e.g., the recap presented at 27 hours since the last session may be shorter than a recap presented for the same consumed portion at 127 hours since the last session as the user may need more recap, etc.), user preference data, a number of times the user has previously consumed the video content, and/or other factors or a combination thereof. The subset of highest ranked video segments may include a first video segment depicted at a third user interface 140 of a car chase scene and a second video segment depicted at a fourth user interface 150 of a gunfight. The car chase scene may be selected as a high ranked segment due to its importance to the movie (e.g., a character may be injured, etc.), and the gunfight scene may be selected as a high ranked segment due to its importance to the movie (e.g., a character may have been killed, etc.).

At a fifth block 180, the remote server may cause presentation of the video summary at a user device. For example, as illustrated in FIG. 1, at the third user interface 140 and the fourth user interface 150, the video summary may be presented in the form of video segments extracted from the consumed portion of content. After presentation of the video summary, in some embodiments, playback of the video content may immediately begin, as illustrated at a fifth user interface 160 (e.g., the fifth user interface 160 illustrates the same scene at which the content was paused at the first user interface 120, etc.). In some embodiments, content summaries that are generated on demand may be stored for later presentation to other users.

As a result, the user may be presented with an on demand video summary of events that occurred during the portion of the video content that the user has consumed, whether during a single consumption session or multiple consumption sessions. Users may therefore refresh their memories of important events that have occurred in portions of content that they previously consumed.

Embodiments of the disclosure may include on demand video recap generation, and may include one or more modules that can be used to analyze digital content. Some embodiments may output customized content summaries for consumed portions of content. Certain embodiments may use one or more detection modules or algorithms (e.g., object recognition modules, pattern recognition algorithms, etc.) to identify or detect the presence of one or more features in the content. Features may include, for example, the presence of certain objects, the occurrence of certain actions or events, certain sounds in an audio file or audio component of the content, certain language in a text file or text component of the content, and so forth. One or more detection modules may be used to process and/or detect various features in the content. In some instances, a module may perform more than one form of analysis. Such detections may be used to generate importance scores for respective segments of content.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain objects and/or presence of certain themes or types of content and may use one or more machine learning modules or algorithms. As a result of improved functionality, customized content summaries may be generated and may include content that may have previously been consumed in connection with user accounts. Embodiments of the disclosure may improve computing efficiency and bandwidth by reducing a length of content summaries based at least in part on actually consumed portions of the summary, resulting in reduced file size. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
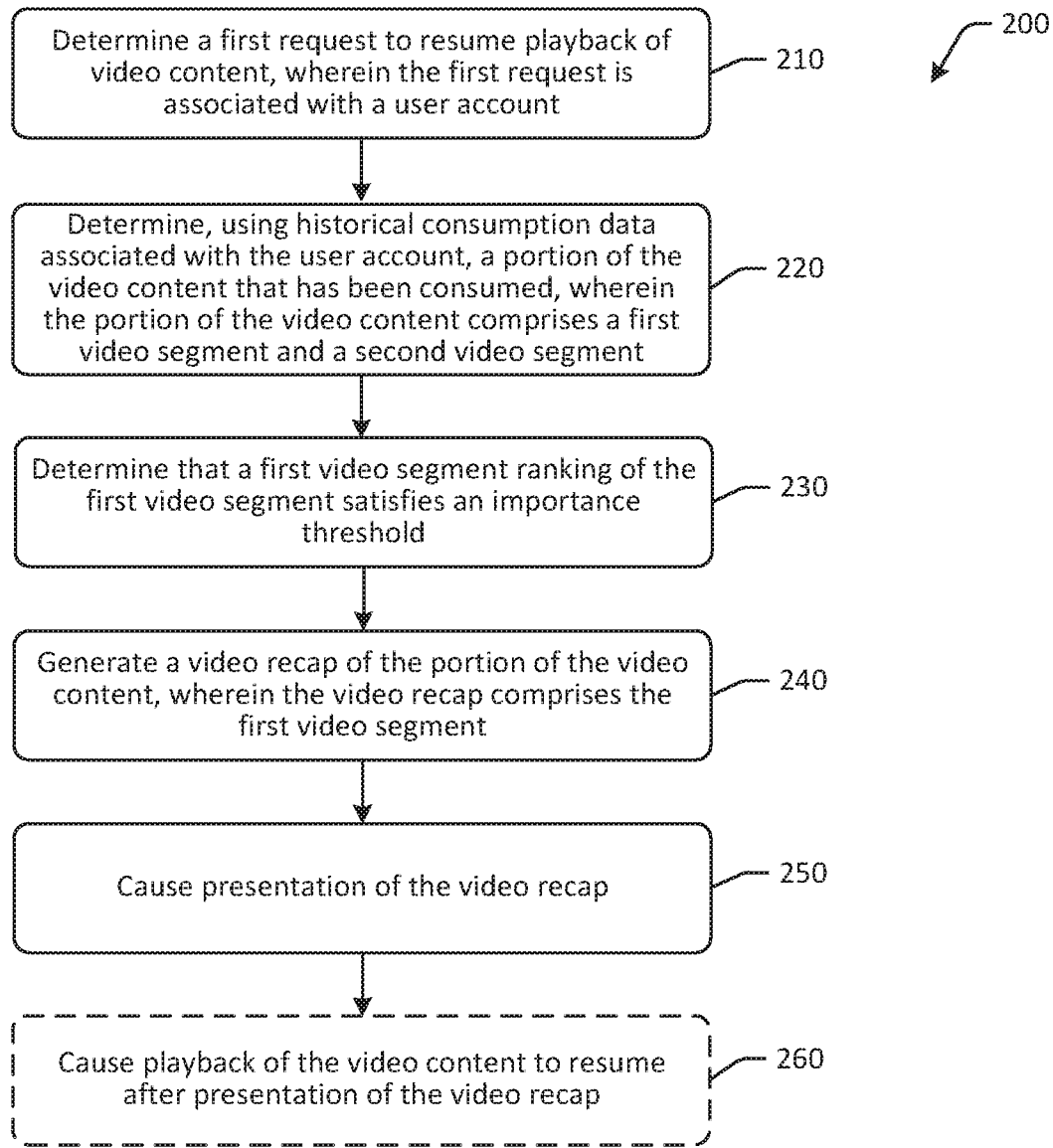
FIG. 2 is a schematic illustration of an example process flow for on demand video recap generation in accordance with one or more example embodiments of the disclosure.

FIG. 2 depicts an example process flow 200 for on demand video recap generation in accordance with one or more example embodiments of the disclosure. While example embodiments of the disclosure may be described in the context of movies or other video content, it should be appreciated that the disclosure is more broadly applicable to any type of digital content, such as series of audio or video content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first request to resume playback of video content, wherein the first request is associated with a user account. For example, one or more content processing modules at a remote server may determine a first request to resume playback of video content. The remote server may determine a user account associated with the first request. The first request may be received from a user device at which a user desires to continue consumption of video content.

At block 220 of the process flow 200, computer-executable instructions stored on a memory of a device, such as a remote server or a user device, may be executed to determine, using historical consumption data associated with the user account, a portion of the video content that has been consumed, wherein the portion of the video content comprises a first video segment and a second video segment. For example, one or more content processing modules at a remote server may determine historical consumption data associated with the user account. The historical consumption data may indicate previous content consumption sessions in which the video content or related video content (e.g., different episodes in the same series, etc.) was consumed in association with the user account. The remote server may determine how much of the video content the user account has consumed. The remote server may optionally determine how many times the user account has consumed the content. The remote server may optionally determine how many sessions the user has consumed the consumed portion in. For example, the user may have consumed one hour of a movie in a single one hour session, or during two separate thirty minute sessions. The remote server may determine an elapsed time since a previous content consumption session in which the user consumed a portion of the video content. The remote server may determine a consumed portion of the video content using the user account. For example, the remote server may determine how much of a movie, episode, or other video account has been consumed by the user account. The consumed portion of the video content may include a first video segment and a second video segment.

At block 230 of the process flow 200, computer-executable instructions stored on a memory of a device, such as a remote server or a user device, may be executed to determine that a first video segment ranking of the first video segment satisfies an importance threshold. For example, a summary generation engine and/or one or more summary generation modules at a remote server may determine that a first video segment ranking of the first video segment satisfies an importance threshold. To determine video segments rankings, the remote server may determine video segments that occur in the consumed portion of the video content. The consumed portion may be a portion of a movie, an episode, previous episodes, or other video content that has been consumed in connection with the user account.

The first video segment may be determined based at least in part on frame-by-frame analysis of the video content. The first video segment may be a video segment of video content, and may be associated with text and/or audio components. The first video segment may be a continuous segment or non-continuous segments that are related. For example, a scene in the content may be interrupted by a flashback or other scene, and may subsequently resume. Segments may correspond to events, scenes, and/or other occurrences that may be discrete and/or extractable from the content. In some instances, segments may correspond to certain locations and/or times, certain actors that appear, certain music or sounds, and/or other features of the content. For example, the remote server may determine a first clip or a first video segment of a movie using content data associated with the movie, such as video analysis data. The first video segment may be a continuous portion of the movie corresponding to a first scene of the movie that occurs from a first timestamp to a second timestamp. The content processing engine of the remote server may determine the respective timestamps for segments. Some segments may have more than one set of start and stop timestamps. For example, a scene may be interrupted and then resume later, in which case there may be more than one pair of start and stop timestamps.

To determine the first video segment, the remote server may extract and/or analyze individual frames of video content to determine whether the frames are part of the same segment or a different segment. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

The remote server may determine, using one or more object recognition algorithms, a first event that occurs in a first set of frames and/or during a video segment. For example, the content processing engine at a remote server may determine a first event that occurs in the first set of frames using one or more object recognition algorithms. Events may be determined based at least in part on objects that are present in video content and/or human poses or activities that occur during scenes. For example, an action and/or human pose detection module may be used to analyze the video and/or audio of the content in a frame-by-frame or segment-by-segment analysis to detect the presence of human actions. Certain embodiments may include a facial recognition module that may be used to analyze video and/or audio of the content in a frame-by-frame or segment-by-segment analysis to detect the presence of facial sentiment, emotional state, and the like.

The remote server may determine importance scores that can be used to rank respective video segments in the consumed portion of video content. The importance scores may be determined based at least in part on events that occur during the respective segments. For example, the importance score for a segment may be determined based at least in part on the detection of certain human actions that occur during the segment, certain objects that appear in the first segment or scene, certain types of conversations and/or dialog that occurs, and/or other factors. Scores may be impacted by events that occur in a segment, such as gunfight, violence, kissing, crying, and so forth. In some embodiments, more than one score may be determined for a specific video segment.

Importance scores may also be generated or impacted using text files or portions of text files associated with a video segment. A text file may be a subtitles file, metadata including a synopsis of the video or portions of the video, actor data, and the like. In some instances, the text file may be generated based at least in part on the audio file of the video (e.g., a speech-to-text conversion of portions of the audio file of the video, etc.). Natural language processing and/or character detection modules or algorithms may be used to determine features such as sentiment of the text, certain predetermined words or phrases (e.g., verbs, keywords, etc.), and other text-based features. For example, a subtitle text file associated with the video may be processed or analyzed using one or more natural language processing algorithms, and a remote server may determine the presence of certain phrases or sentences in the text file.

In some embodiments, audio content associated with the content may be used in addition to, or instead of, text content to determine sentences that occur in a segment. For example, a remote server may analyze an audio file corresponding to a video. The audio file may include audible sounds, such as dialog, sound effects, soundtrack music, and the like corresponding to the video component of the video. For example, audio may be processed to extract dialog (e.g., filtered to remove sound effects, music, etc.), and the extracted dialog may be processed using speech-to-text processing algorithms. The output may be processed using natural language processing. In an example, an audio processing module may be used to determine the presence of dialog, sound effects, and other instances of audio events that may be used to determine themes of content in a segment. For example, the audio processing module may parse or segment audio associated with the content and identify events or instances of certain indicators or occurrences, such as ocean waves, fire trucks, ambulances, screams, and other audio that may be indicative of actions or events occurring during the segment.

In some embodiments, audio content may be segmented into one or more discrete portions for classification and/or analysis. For example, segments may be classified as music, dialog, sound effects, and so forth. Differently classified portions may be analyzed using different signal processing and/or speech-to-text profiles. In some embodiments, natural language processing may be used to determine a meaning of certain portions of audio. In one example, an audio processing algorithm may be used to determine presence of an explosion feature in the audio file. In another example, the same or a different audio processing algorithm may be used to determine presence of screams in the audio file. In another example, presence of audio indicative of a gunshot in the audio file may be determined using a violence audio recognition model.

Importance scores may be used to rank the respective segments of the consumed portion of video content to determine which segments are to be included in a video summary or recap. For example, an importance threshold may be used to determine segments to include in the video summary. Segments with scores greater than or equal to the importance threshold may be included in the video summary, whereas segments with scores less than the importance threshold may be excluded. The importance threshold may be dynamic, such as, in one example, the importance threshold may be relatively higher if the user recently consumed the video content, or relatively lower if the user has not consumed the video content within a time interval, such as the last thirty days. As a result, the user may desire a longer recap, so the reduced importance threshold may result in additional segments being included in the video summary. The remote server may determine that an importance score for the first video segment satisfies (e.g., meets or exceeds, etc.) the importance threshold.

At block 240 of the process flow 200, computer-executable instructions stored on a memory of a device, such as a remote server or a user device, may be executed to generate a video recap of the portion of the video content, wherein the video recap comprises the first video segment. For example, the summary generation engine at a remote server may generate a video recap of the portion of the video content, wherein the video recap comprises the first video segment. The video recap may include one or more video segments that are associated with importance scores that satisfy the importance threshold.

At block 250 of the process flow 200, computer-executable instructions stored on a memory of a device, such as a remote server or a user device, may be executed to cause presentation of the video recap. For example, the summary generation engine at a remote server may cause presentation of the video recap. The remote server may generate the video recap and may send the video recap in a data stream to the user device for presentation. The user may consume the video summary.

At optional block 260 of the process flow 200, computer-executable instructions stored on a memory of a device, such as a remote server or a user device, may be executed to cause playback of the video content to resume after presentation of the video recap. For example, the content processing modules at a remote server may automatically cause playback of the video content to resume from the part the user left off after presentation of the video summary or recap.

In some embodiments, a user may request a recap for video content that is part of a series of related video content. In such instances, the remote server may determine that the video content is an episode in a series of episodes, such as a television show series, a movie trilogy, or any other series of video content, or is otherwise associated with related video content, and may generate a video summary that includes at least one video segment from a preceding episode (which may include one or more preceding television show episodes, movies, or other video content). As a result, certain embodiments may include segments in recaps that are not only from a single piece of video content, such as a movie, but include segments from related video content, such as an earlier movie (e.g., part I of a 3 part movie trilogy, episode 1 of a series, etc.).

Some embodiments may include character-specific recaps or video summaries. For example, a user may be interested in viewing a recap of a certain character's development in a movie or other video content. The remote server may determine a character in the video content, and may receive a request for a character recap. The remote server may determine that the character appears in a second video segment, and may determine an importance score for the second segment relative to other video segments in which the character appears. The remote server may determine that the importance score for the second segment satisfies the importance threshold for that particular character, and may therefore generate a character recap that includes the second video segment. The character recap may include portions of the video content, or other related content, that is related to character development of the character. In some embodiments, a character development threshold may be used in addition to, or instead of, the importance threshold. The character development threshold may be indicative of a level of importance of a video segment in which a character appears to the character's overall development in the video content. For example, if the character appears numerous times in the video content, the character development threshold may be relatively higher than if the character appears a lesser number of times in the video content. Accordingly, the remote server may determine that the second video segment satisfies a character development threshold, and may include the segment in a character summary or recap.

Figure 3:
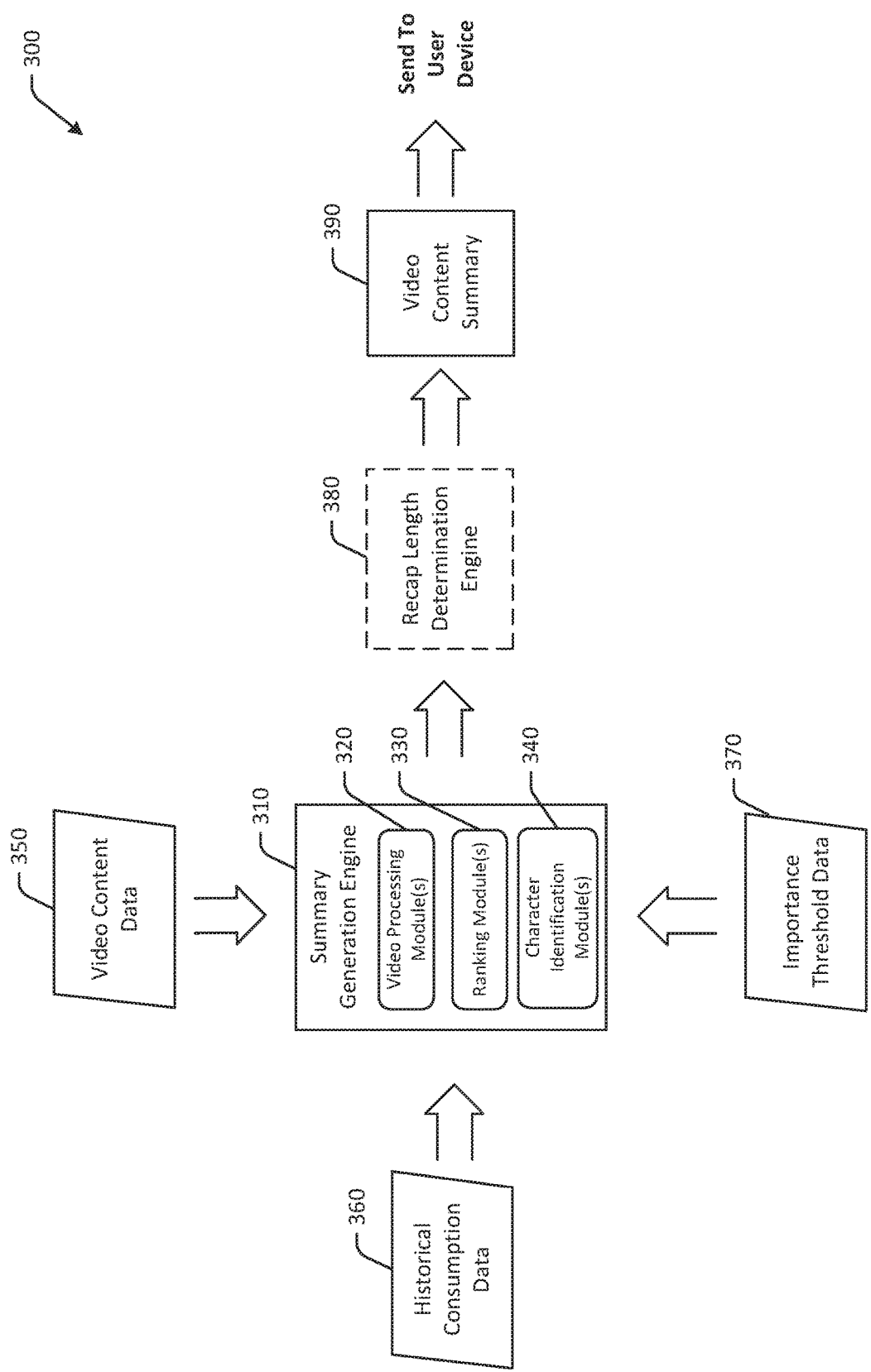
FIG. 3 is a schematic illustration of an example data flow for generating content summaries in accordance with one or more example embodiments of the disclosure.

FIG. 3 is a schematic illustration of an example data flow 300 for generating content summaries in accordance with one or more example embodiments of the disclosure. Different embodiments may include different, additional, or fewer inputs or outputs than those illustrated in the example of FIG. 3.

In FIG. 3, an example data flow 300 is schematically depicted. A summary generation engine 310 and/or one or more summary generation module(s) may be configured to generate video summaries for consumed portions of video content. The summary generation engine 310 may be stored at and/or executed by one or more remote servers. The summary generation engine 310 may include one or more modules or algorithms, and may be configured to generate video summaries for consumed portions of video content.

For example, the summary generation engine 310 may include one or more video processing modules 320, one or more ranking modules 330, and/or one or more character identification modules 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects or certain types of scenes, which may include action, violence, romance, drama, and the like. For example, a video file for a movie may include a first frame, a second frame, and so forth. The video processing module(s) 320 may be configured to detect or analyze frames in video content to determine which frames correspond to the same scene or segment. For example, the video processing module(s) 320 may include facial recognition and/or human pose detection algorithms that can be used to identify people or themes in certain locations over frames or segments of the video content, which may not always be consecutive. For example, a scene may be briefly interrupted by a flashback or cut to a different story, and may resume thereafter. Video processing module(s) 320 may include one or more object recognition algorithms configured to detect at least one of predefined objects, predefined scenery (e.g., certain locations, etc.), and the like. The video processing module(s) 320 may be configured to determine or identify segments that appear in one or more consumed portions of video content.

The ranking module(s) 330 may be configured to determine scores, such as importance scores, that correspond to respective video segments, and to determine a ranking of segments based at least in part on the respective scores. In some embodiments, the ranking module(s) 330 may process and/or analyze audio content, such as audible dialog, sound effects, music, and other audio, and/or perform natural language processing to determine a meaning of certain portions of audio or its corresponding transcription. The ranking module(s) 330 may be configured to detect features such as violence (e.g., gunshots, explosions, etc.), romance, dialogue (e.g., presence of certain words or phrases, etc.), sentiment, tone, and/or other features. Ranking module(s) 330 may include one or more algorithms configured to detect at least one of predefined expressions, predefined sounds, and the like. The ranking module(s) 330 may be used to determine which video segments are to be included in a video summary or recap based at least in part on importance scores generated by the ranking module(s) 330 for the respective video segments.

The character identification module(s) 340 may be configured to analyze and/or process video content so as to identify one or more actors or characters that appear in a certain video segment. In combination with events that occur during the respective segments, character development scores and/or importance scores for the specific character may be determined. Output from the character identification module(s) 340 may be used to generate character summaries or character development recaps in some embodiments.

The summary generation engine 310 may receive one or more inputs that may be used to generate on demand video summaries. For example, the summary generation engine 310 may receive one or more of video content data 350 associated with content for which a video summary is to be generated, historical consumption data 360 that may include user account-specific consumption data, and/or importance threshold data 370 that may be used to determine video segments to include in the video summary. In some embodiments, the video content data 350 may be associated with audio data and/or text data 370 that may be extracted from a content file.

The summary generation engine 310 may process the respective data to generate a video summary. For example, the video data 350 may be processed using one or more of the video processing module(s) 320, the ranking module(s) 330, and/or the character identification module(s) 340. The historical consumption data 360 may be processed using one or more of the video processing module(s) 320. The importance threshold data may be processed using one or more of the video processing module(s) 320, the ranking module(s) 330, and/or the character identification module(s) 340.

The summary generation engine 310 may determine, using the historical consumption data 360, an amount of video content that a user account has consumed. For example, the amount of video content may be a portion of a movie, a portion of an episode, a number of consumed episodes in a series, a number of times the entire movie or series has been consumed, and/or other historical consumption data 360.

Using the video content data 350, the summary generation engine 310 may determine one or more video segments that corresponds to the consumed portion(s) of the video content. The summary generation engine 310 may determine respective scores, such as importance scores, for the video segments that occur in the consumed portion(s) of the video content.

Using the importance threshold data 370, the summary generation engine 310 may determine which video segments of the consumed portion(s) of content are to be included in the video summary or recap. The importance threshold data 370 may indicate, for example, that video segments having scores over a certain threshold value are to be included in a summary, or that video segments of the top three ranking values are to be included, or that video segments that have not been previously included in recaps presented in association with the user account are to be included, and/or other criteria.

Using one or more algorithms or modules, the summary generation engine 310 may determine the presence of one or more types of segments in the consumed portion(s) of the video content, and may be in communication with an optional recap length determination engine 380. The recap length determination engine 380 may be configured to determine a total length of video summaries that are to be generated. The recap length determination engine 380 may, for example, trim portions of video segments included in a video summary to satisfy certain length criteria, such as a time limit and the like. For example, if a maximum length of a recap is four minutes, but the selected video segments for the video summary have a total length of five minutes where each segment is longer than one minute, the recap length determination engine 380 may determine portions of the respective segments to delete, or the recap length determination engine 380 may determine that the video summary is to be presented at an increase speed (e.g., 1.5×, etc.), and/or other manipulations to the length of the video summary or recap. The selected segment portions (which may include some entire segment portions) may be stitched together by the summary generation engine 310 to form the content summary. In some embodiments, the segment portions may be blended together at beginnings or ends using one or more transitions.

The summary generation engine 390 and/or optionally the recap length determination engine 380 may output a video content summary 390 that may be sent to a user device for presentation. As a result, users may consume on demand video summaries for consumed portions of video content. The video segments presented in the video summary may be relevant and may quickly remind the user of plot elements in the consumed portion of video content.

In some embodiments, the summary generation engine 310 may use the historical consumption data 360 to determine an elapsed time between an end of a previous content consumption session and a current content consumption session. The summary generation engine 310 may determine that the elapsed time satisfies a recap threshold, and may therefore cause presentation of an option to present the video summary at a user interface associated with the user device. In other embodiments, the recap option may always be presented.

In some embodiments, the summary generation engine 310 may determine a length of time of the consumed portion of the video content that the user account previously consumed. The summary generation engine 310 may determine the importance threshold based at least in part on the length of time. For example, if the user has only consumed one hour of the video content, the recap may not have a length of forty minutes. In contrast, if the user is resuming a television series after a year, a recap of the previous episodes across multiple seasons may be forty minutes.

In some embodiments, a length of the video summary may be determined based at least in part on how long it has been since the last time the user account consumed a portion of the video content. For example, the summary generation engine 310 may determine a length of time that has elapsed between a previous content consumption session of the video content and a current time, or a time at which a recap is requested, and may determine a length of the video recap based at least in part on the length of time. For example, if the user watched a portion of the video content less than 24 hours ago, the recap may be relatively shorter than if the user watched a portion of the video content a week ago. This may be because the user may have a relatively more fresh memory of the video content.

In some embodiments, the summary generation engine 310 may determine an elapsed time between the starting time of the movie or other video content and the end time of the consumed portion to determine how much of the video content the user has consumed. The summary generation engine 310 may determine a number of video segments to include in the subset of highest ranked video segments using the elapsed time, where the number of video segments increases as the elapsed time increases. The number of segments may be included regardless of the respective lengths in some embodiments.

In some embodiments, if a user requests more than one recap within a timeframe, a second summary of greater length may be generated as the user may not remember the content, and therefore requested an additional recap. For example, the summary generation engine 310 may determine a second request for a second video recap of the video content within a time interval of the first request, such as within 24 hours of the first video recap. The summary generation engine 310 may generate a second video recap of the portion of the video content, where a second length of the second video recap is greater than the first length. The second recap may include some of the same or different video segments.

If a user has completed consumption of video content in the past, recaps may be relatively shorter. For example, the summary generation engine 310 may determine, using the historical consumption data 360, a number of times the video content has been consumed in association with the user account, and the summary generation engine 310 may determine a length of the video recap based at least in part on the number of times.

Figure 4:
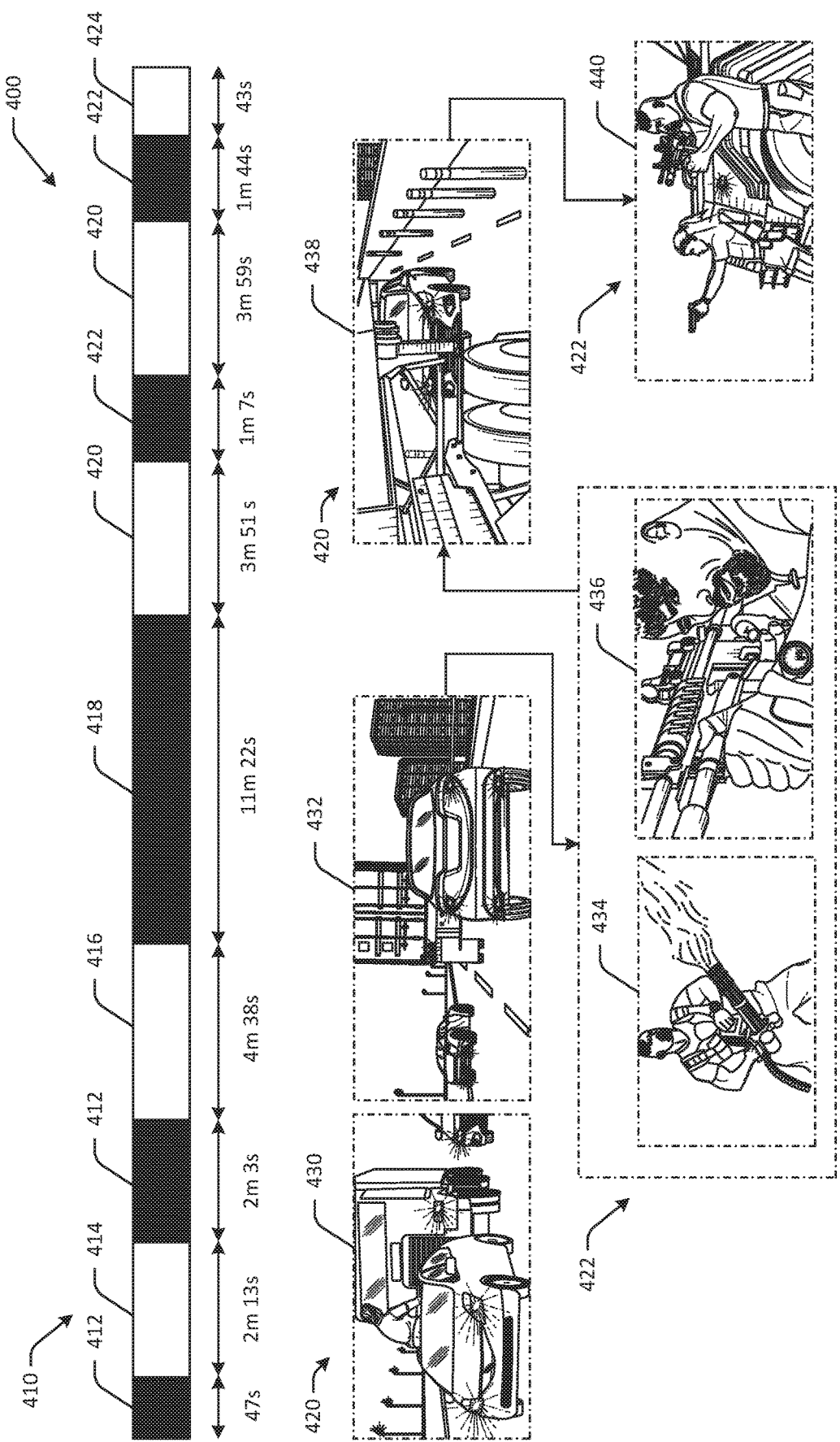
FIG. 4 is a schematic illustration of example segment identification and scene detection in accordance with one or more example embodiments of the disclosure.

FIG. 4 is a schematic illustration of example use case 400 of segment identification in digital content and scene detection in accordance with one or more example embodiments of the disclosure. In FIG. 4, video content 410 is represented in a bar format and may include a number of different segments. The content may be video content, such as a movie, television show, or other video content. Segments may correspond to certain scenes or segments of the content 410 and may or may not be continuous, and may have different lengths. Segments may be identified using one or more timestamps. The segments of content 410 are illustrated in alternating black and white blocks for illustrative purposes only.

For example, the content 410 may include a first segment 412 having a length of 47 seconds and a subsequent length of 2 minutes 3 seconds. The first segment 412 may be interrupted or separated by a second segment 414 having a length of 2 minutes 13 seconds. The first segment 412 may therefore be associated with a first start timestamp of 0:00 and a first end timestamp of 0:47, as well as a second start timestamp of 3:00 and a second end timestamp of 5:03. The second segment 414 may be associated with a start timestamp of 0:47 and an end timestamp of 2:59 or 3:00.

A third segment 416 may follow the second segment 412 and may have a length of 4 minutes 38 seconds. A fourth segment 418 may follow the third segment 416 and may have a length of 11 minutes 22 seconds. A fifth segment 420 may follow the fourth segment 418 and may have a first length of 3 minutes 51 seconds and a second length of 3 minutes 59 seconds. The fifth segment 420 may be separated by a first sub-segment of a sixth segment 422 having a length of 1 minute 7 seconds. The sixth segment 422 may have a second sub-segment of a length of 1 minute 44 seconds that follows the second sub-segment of the fifth segment 420. A seventh segment 424 may follow the second sub-segment of the sixth segment 422, and so forth. Some or all of the respective segments and/or sub-segments may be associated with respective timestamps.

FIG. 4 is a schematic illustration of example segment identification that can be used to determine importance scores and subsequent inclusion in video summaries. For example, the fifth segment 420 may have a first sub-segment and a second sub-segment that is separated by a first sub-segment of the sixth segment 422. As illustrated in FIG. 4, the fifth segment 420 may include a first frame 430 and a second frame 432. The first frame 430 may include a car that may be identified using an object recognition algorithm, and the second frame 432 may include a car chasing another car, which may be determined using an action detection engine that may compare and/or analyze frames. The first frame 430 and the second frame 432 may therefore be associated with relatively high importance scores if the scenes in the segment are important to the storyline.

The sixth segment 422 may include a first frame 434 and a second frame 436. The first frame 434 and the second frame 436 may include an action scene with a firearm, as identified using object recognition algorithms. The respective frames may be associated with corresponding metadata, which may include additional data, such as the type of camera angle (e.g., far shot for first frame 434 and close-up shot for the second frame 436, etc.). The first frame 434 and the second frame 436 of the sixth segment 422 may be after the second frame 432 of the fifth segment 420. The content 410 may then return to the fifth segment 420, which may include a third frame 438 that continues the car chase scene. The content 410 may then return to the sixth segment 422, which may include a third frame 440 that continues the gunfight scene. In the example of FIG. 4, the fifth segment 420 and the sixth segment 422 may be identified as different segments because, for example, they may be occurring at different locations and may be unrelated. However, if the gunfight scene involved the car chase, such as if the actors were shooting at the cars, the segment may have been identified as a single segment.

Timestamps may be determined for segments and/or events that occur in the content 410. For example, a first timestamp may be associated with a start of the first event, and a second timestamp may be associated with an end of the first event. Timestamps may be used to generate video summaries. For example, a video summary may include segments or portions of segments as identified using respective start and end timestamps.

The remote server may therefore, in one example, determine a first timestamp at which the car chase scene begins, a second timestamp at which a cut scene begins (e.g., the sixth segment 422) during the car chase scene, a third timestamp at which the cut scene ends (e.g., end of the first sub-segment of the sixth segment 422), a fourth timestamp at which the car chase scene ends (e.g., end of the second sub-segment of the fifth segment 420), and so forth. If the car chase scene were to be included in the content summary, and the fifth segment 420 included portions that did not have much action (e.g., people talking inside a car, etc.) and the user preferences indicated action-themed content is desired, the non-action portions of the segment may not be included in the video summary.

To identify segments, the remote server may extract video, audio, and/or text files from a content file. For example, the remote server may extract a first set of video frames that correspond to the content and/or a segment of the content (if the segment has been identified). The extracted video frames may be processed. For example, the remote server may determine, using one or more image recognition algorithms, that the first set of video frames, which may correspond to the fifth segment 420, include a car chase scene. In some instances, a remote server or a user device may be used to analyze one or more portions of video of a content file to determine whether instances of any predefined objects are present. Predefined objects may be certain objects such as firearms, explosions, needles, drugs, and so forth. Objects may be determined to be present based at least in part on object detection, or other audio, text, image, or video processing algorithms. In some embodiments, individual frames or sets of frames, or portions of text data or audio data, may be analyzed to determine whether any predefined objects are present.

The remote server may extract first audio data that corresponds to the content and/or a segment of the content from the content data, and may determine, using one or more sound processing algorithms, that the first audio data includes gunshot sounds. The remote server may determine, based at least in part on the car chase scene and the gunshot sounds, that the first clip or first segment is an action clip or an action segment. The remote server may determine a second clip or a second segment of the content, and may determine, for example, that the second clip is a romance clip. Importance scores may be generated for the segments based at least in part on the processing of the video content and the determined events that may occur or characters that may appear in the respective segments. For example, the remote server may determine, based at least in part on events that occur during the first scene, an importance ranking for the first video segment, where the importance ranking is used to rank video segments of the consumed portion of the movie. Accordingly, some embodiments may select portions of a segment or sub-segment to include in a content summary or movie trailer.

Figure 5:
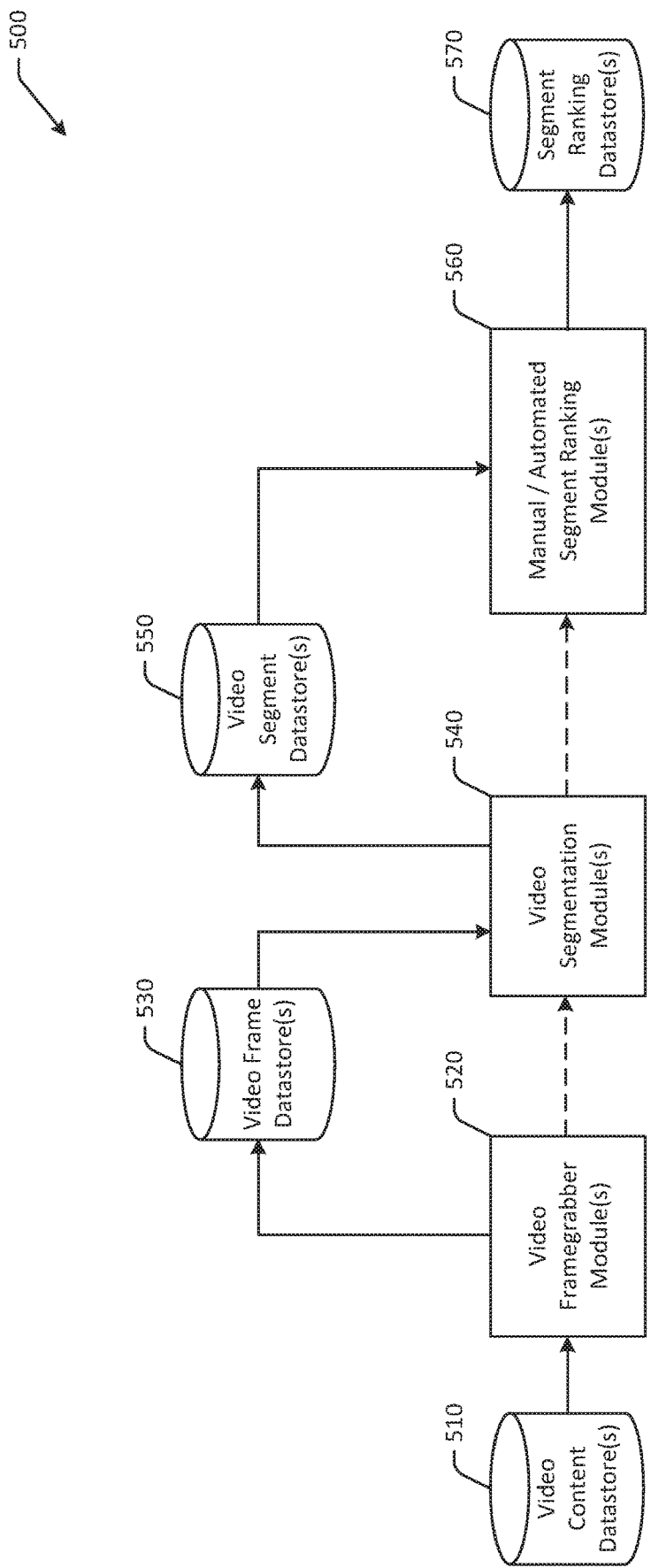
FIG. 5 is a schematic illustration of an example process and data flow in accordance with one or more example embodiments of the disclosure.

FIG. 5 is a schematic illustration of an example process and data flow 500 in accordance with one or more example embodiments of the disclosure. Different embodiments may include different, additional, or fewer inputs or outputs than those illustrated in the example of FIG. 5.

In the system illustrated in FIG. 5, a video content datastore 510 may include video files associated with video content. A video frame grabber module(s) 520 at a remote server may determine the video content from the video content datastore 510 and may extract one or more segments of the video content to determine segments of the video content and the corresponding frames. The video frame grabber module(s) 520 may select frames from the video content and may cause the frames to be stored at a video frame datastore 530. In some embodiments, timestamp data corresponding to the frames may be stored at the video frame datastore 530.

A video segmentation module(s) 540 may read the frames in the video frame datastore 530 and/or may receive the frames from the video frame grabber module(s) 520 and may determine the segments that the frames correspond to. The video segmentation module(s) 540 may write the segment data to a video segment datastore 550.

A manual or automated segment ranking module(s) 560 may read the segments in the video segment datastore 550 or may receive the segments from the video segmentation module(s) 540. The manual or automated segment ranking module(s) 560 may generate importance scores for respective video segments and may determine rankings for the segments using the scores.

The segment importance ranking values may be stored at a segment ranking datastore 570 and may be used to generate video summaries. In some embodiments, the segment ranking datastore 570 may be stored in cache memory to allow for reduced latency in on demand video summary generation.

Figure 6:
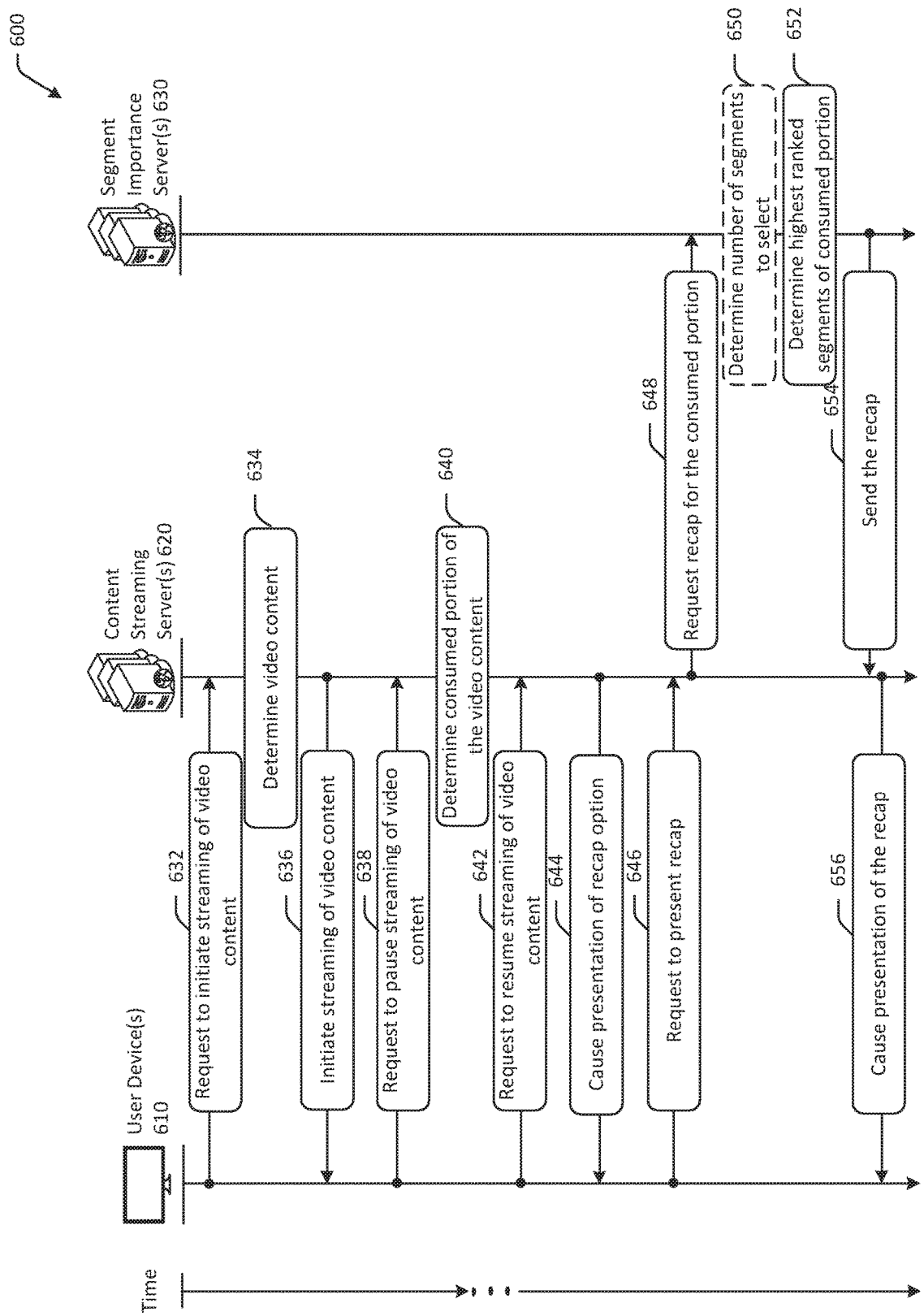
FIG. 6 is a schematic illustration of an example process flow over time in accordance with one or more example embodiments of the disclosure.

FIG. 6 is a schematic illustration of an example process flow 600 over time in accordance with one or more example embodiments of the disclosure. Different embodiments may include different, additional, or fewer inputs or outputs than those illustrated in the example of FIG. 5.

In FIG. 6, a user may be consuming video content at a user device 610, such as a television, a streaming device, a smartphone, or another device. The user device 610 may be in communication with a content streaming server 620. The content streaming server 620 may be configured to provide video content to the user device 610 for presentation. The content streaming server 620 may be in communication with a segment importance server 630. The segment importance server 630 may be configured to determine importance values for various segments of video content.

At an operation 632, the user device 610 may send a request to initiate streaming of video content to the content streaming server 620. The content streaming server 620 may receive the request and may determine a user account associated with the user device 610. The content streaming server 620 may determine a content identifier of the requested video content. At operation 634, the content streaming server 620 may determine the video content for streaming. The video content may be the requested video content. At operation 636, the content streaming server 620 may initiate streaming of the video content to the user device 610. The user may therefore consume the video content at a display of the user device 610.

At operation 638, the user device 610 mays end a request to pause streaming of the video content. For example, the user may have completed a consumption session and may therefore desire to pause playback. The user device 610 may therefore send the request to pause streaming. At operation 640, the content streaming server 620 may determine a consumed portion of the video content. For example, the content streaming server 620 may determine a timestamp at which playback was paused for the video content. The timestamp may indicate how much of the video content the user consumed. In some embodiments, the content streaming server 620 may determine an episode number or other identifier of the video content to determine how much of a series of content the user has consumed instead of, or in addition to, how much of a particular video content the user has consumed.

At a later point in time, the user may desire to continue playback. At the same user device 610 or a different user device, a request to resume streaming of the video content may be sent to the content streaming server 620 at operation 642. At operation 644, the content streaming server 620 may cause presentation of a recap option at the user device 610. For example, before playback resumes, the content streaming server 620 may cause presentation of an option to recap a consumed portion of the video content.

At operation 646, the user device 610 may request to present the recap. For example, the user may select the recap option at the user interface. The content streaming server 620 may receive the request for the recap, and at operation 648, the content streaming server 620 may send a request for a recap of the consumed portion to the segment importance server 630. The segment importance server 630 may optionally determine a number of segments to select from the consumed portion at optional operation 650. At operation 652, the segment importance server 630 may determine the highest ranked segments of the consumed portion. At operation 654, the segment importance server 630 may send the recap and/or the highest ranked segments (which may correspond to the number of segments to select) to the content streaming server 620. The content streaming server 620 may cause presentation of the recap at operation 656. The user may consume the recap of the consumed portion at the user device 610.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
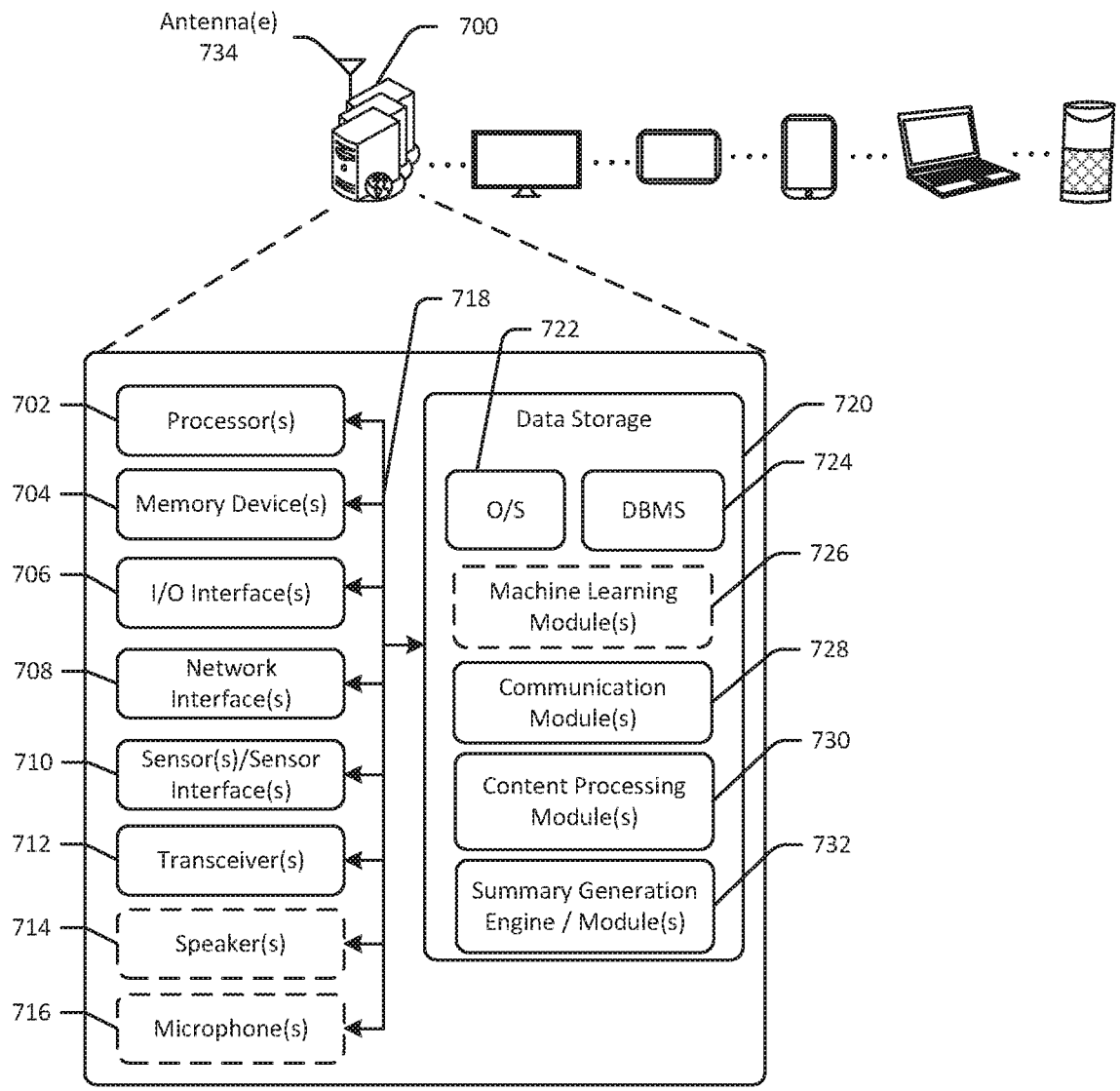
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of video summarization functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, a magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more optional machine learning module(s) 726, one or more communication module(s) 728, one or more content processing module(s) 730, and/or one or more summary generation engine/module(s) 732. Some or all of these jmodule(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user action information, user profile information, historical content consumption information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the optional machine learning module(s) 726 may include computer-executable instructions, code, or the like that responsive to execution by one or more of the processor(s) 702 may perform functions including, but not limited to, determining summary length, determining importance thresholds, determining a number of segments to include in a video summary, determining frames of content, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content processing module(s) 730 may include computer-executable instructions, code, or the like that are responsive to execution by one or more of the processor(s) 702 may perform functions including, but not limited to, analyzing digital content, extracting frames, determining pixel color values, determining audio content, determining or analyzing text and/or audio files, identifying certain portions of content, extracting segments of content, and the like.

The summary generation engine/module(s) 732 may include computer-executable instructions, code, or the like that responsive to execution by one or more of the processor (s) 702 may perform functions including, but not limited to, selecting segments or portions of segments to include in a summary video, selecting music or portions of music or other sounds to include in a summary video file, selecting a specific summary for a user based on user preferences, generating video summaries, determining elapsed times, determining consumed portions, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separated. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, a first request to resume playback of video content, wherein the first request is associated with a user account;
   determining, using historical consumption data associated with the user account, a portion of the video content that has been consumed, wherein the portion of the video content comprises a first video segment and a second video segment;
   determining a length of time of the portion of the video content that has been consumed;
   determining an importance threshold based at least in part on the length of time, wherein the importance threshold represents importance of a video segment to a plot of the video content, and wherein the importance threshold decreases as the length of time increases;
   determining that a first video segment ranking of the first video segment satisfies the importance threshold;
   generating a video recap of the portion of the video content, wherein the video recap comprises the first video segment and is of a first length of time;
   causing presentation of the video recap;
   determining a second request for a second video recap of the video content within a time interval of the first request;
   determine a length of time criteria for the second video recap based on the first video recap, wherein the length of time criteria includes a second length of time for the second recap video being greater in length than the first length of time; and
   generating, using the length of time criteria, the second video recap of the portion of the video content.

2. The method of claim 1, further comprising:
   causing playback of the video content to resume after presentation of the video recap.

3. The method of claim 1, further comprising:
   determining a first frame of the first video segment;
   determining, using one or more pattern recognition algorithms, that the first frame corresponds to a start of a first scene;
   determining a second frame of the first video segment;
   determining, using one or more pattern recognition algorithms, that the second frame corresponds to an end of the first scene;
   determining an event that occurs during the first scene; and
   determining, based at least in part on the event, the first video segment ranking.

4. The method of claim 1, further comprising:
   determining that the video content is an episode in a series of episodes;
   wherein generating the video recap of the portion of the video content comprises generating the video recap of the portion of the video content comprising at least one video segment from a preceding episode.

5. The method of claim 1, further comprising:
   determining a character in the video content;
   determining a second request for a character recap;
   determining that the character appears in the second video segment; and
   generating a character recap that comprises the second video segment, wherein the character recap includes portions of the video content related to character development of the character.

6. The method of claim 5, further comprising:
   determining that the second video segment satisfies a character development threshold.

7. The method of claim 1, further comprising:
   determining a length of time that has elapsed between a previous content consumption session and the first request; and
   determining a length of the video recap based at least in part on the length of time.

8. The method of claim 7, further comprising:
   causing presentation of a video recap option for the video content at a user interface based at least in part on the length of time.

9. The method of claim 1, further comprising:
   determining, using the historical consumption data, a number of times the video content has been consumed; and
   determining a length of the video recap based at least in part on the number of times.

10. A system comprising:
    memory configured to store computer-executable instructions; and at least one computer processor configured to access the memory and execute the computer-executable instructions to:
- determine a first request to resume playback of video content, wherein the first request is associated with a user account;
- determine, using historical consumption data associated with the user account, a portion of the video content that has been consumed, wherein the portion of the video content comprises a first video segment and a second video segment;
- determine a length of time of the portion of the video content that has been consumed;
- determine an importance threshold based at least in part on the length of time, wherein the importance threshold represents importance of a video segment to a plot of the video content, and wherein the importance threshold decreases as the length of time increases;
- determining that a first video segment ranking of the first video segment satisfies the importance threshold;
- generate a video recap of the portion of the video content, wherein the video recap comprises the first video segment;
- cause presentation of the video recap;
- determine a second request for a second video recap of the video content within a time interval of the first request;
- determine a length of time criteria for the second video recap based on the first video recap, wherein the length of time criteria includes a second length of time for the second recap video being greater in length than the first length of time; and
- generate, using the length of time criteria, a second video recap of the portion of the video content.

11. The system of claim 10, wherein the at least one processor is further configured to access the memory and execute the computer-executable instructions to:
- cause playback of the video content to resume after presentation of the video recap.

12. The system of claim 10, wherein the at least one processor is further configured to access the memory and execute the computer-executable instructions to:
- determine a first frame of the first video segment;
- determine, using one or more pattern recognition algorithms, that the first frame corresponds to a start of a first scene;
- determine a second frame of the first video segment;
- determine, using one or more pattern recognition algorithms, that the second frame corresponds to an end of the first scene;
- determine an event that occurs during the first scene; and
- determine, based at least in part on the event, the first video segment ranking.

13. The system of claim 10, wherein the at least one processor is further configured to access the memory and execute the computer-executable instructions to:
- determine a character in the video content;
- determine a second request for a character recap;
- determine that the character appears in the second video segment; and
- generate a character recap that comprises the second video segment, wherein the character recap includes portions of the video content related to character development of the character.

* * * * *